United States Patent [19]

Cockerham

[11] Patent Number: 5,255,850
[45] Date of Patent: Oct. 26, 1993

[54] PIVOTING FLAPS AND VANE PACK IN A NOZZLE REVERSER ASSEMBLY

[75] Inventor: Jefre H. Cockerham, Jupiter, Fla.

[73] Assignee: The United States of America as represented by the Secretary of the Air Force, Washington, D.C.

[21] Appl. No.: 908,676

[22] Filed: Jun. 29, 1992

[51] Int. Cl.$^5$ ............................................. F02K 1/70
[52] U.S. Cl. ........................... 239/265.29; 239/265.25; 239/265.19; 244/110 B; 60/226.2
[58] Field of Search ....................... 239/265.19, 265.27, 239/265.29, 265.31, 265.25; 244/110 B, 110 D; 60/226.2, 229, 230

[56] References Cited

U.S. PATENT DOCUMENTS

| | | | |
|---|---|---|---|
| 2,997,845 | 8/1961 | Oulianoff | 239/265.27 |
| 3,299,638 | 1/1967 | Santamaria et al. | 239/265.19 |
| 4,564,160 | 1/1986 | Vermilye | 239/265.29 |
| 4,798,328 | 1/1989 | Thayer et al. | 239/1 |
| 4,805,401 | 2/1989 | Thayer et al. | 239/265.27 |
| 4,819,876 | 4/1989 | Thayer | 239/265.25 |
| 4,828,173 | 5/1989 | Guerty | 239/1 |
| 4,836,451 | 6/1989 | Herrick et al. | 239/265.27 |
| 5,090,197 | 2/1992 | Dubois | 239/265.29 |
| 5,092,525 | 3/1992 | Roach et al. | 239/265.29 |
| 5,161,752 | 11/1992 | Cockerham et al. | 239/265.27 |

FOREIGN PATENT DOCUMENTS

| | | | |
|---|---|---|---|
| 2027882 | 6/1970 | Fed. Rep. of Germany | 244/110 B |
| 1002709 | 8/1965 | United Kingdom | 244/110 B |

Primary Examiner—Andres Kashnikow
Assistant Examiner—Christopher G. Trainor
Attorney, Agent, or Firm—Donald J. Singer; Thomas C. Stover

[57] ABSTRACT

In a nozzle reverser assembly for a gas turbine engine, a swinging vane pack reverser is provided in place of the prior art array of cascade vanes in reverser ports of such engines. The present invention includes a door flap that is hinged on the aft side of a reverser port, which door flap has sidewalls attached thereto that extend into such port. The reverser assembly of the invention also includes a vane pack that is hinged at the forward-end of such reverser port and has a roller attached its aft end, which roller engages a track within the door flap for sliding engagement therewith. Forward of the vane pack hinge, a boundary layer trip fence is hinged to the engine housing. In operation, air flow directed into the reverser cavity, e.g. by a convergent flap, is guided further by the above door flap and its sidewalls. The flow then passes through the longitudinally disposed vanes of the vane pack, which pack extends across the reverser port and between the door flap and trip fence, which in their open position, extend forward at acute angles with such engine, to define an external reverser channel therefor. The boundary layer trip fence prevents the gas exiting the reverser from traveling up the air frame boundary layer while the vane pack provides for lateral vectoring to prevent reverser gas flow from impinging on aircraft control surfaces. Thus, reverser flow can be directed from an engine at desired pitch and splay angles and at reduced flow blockage through such vanes.

7 Claims, 6 Drawing Sheets

PIVOTING FLAPS AND VANE PACK IN A NOZZLE REVERSER ASSEMBLY

STATEMENT OF GOVERNMENT INTEREST

The invention described herein may be manufactured and used by or for the Government for governmental purposes without the payment of any royalty thereon.

BACKGROUND OF THE INVENTION

1. Field of the Invention

This invention relates to a reverser flap assembly for a gas turbine nozzle, particularly one with pivoting members.

2. The Prior Art

Reverser flap assemblies for gas turbine nozzles are known in the prior art. See FIG. 1 hereof, and U.S. Pat No. 4,798,328 to Thayer et al (1989) and U.S. Pat. No. 4,828,173 to Guerty (1989), which are incorporated herein by reference.

Per FIG. 1, the prior art nozzle 10 has convergent flap 12 and divergent flap 14 pivotably mounted therein, which can direct axial gas flow through the engine when pivoted to an open position or as here, when convergent flap 12 is pivoted to the closed position, shown in FIG. 1, the engine core gas flow per arrow 15, is directed through the reverser channel 18 and out through cascade vane assembly 20, as shown in FIG. 1. A sliding door 22 slides over the cascade vanes when the reverser flow 15 is not employed, as indicated in FIG. 1.

As shown in FIGS. 2, 3, and 4, the individual vanes 24 and 26 of the prior art vane pack 20, are doubly turned to provide a relatively small opening 28, e.g. as shown in FIGS. 2 and 3. This is because the cascade vanes need to perform the double function of a) reversing the engine jet flow against the direction of travel of an engine (and its aircraft). Also however, b) the vanes 24 of the cascade vane assembly 20 must also turn or splay the so reversed jet flow laterally and outwardly at an angle with the skin of the various aircraft components so as to avoid distorting the air flow thereover and also to avoid re-ingestion of such reverser engine core gas back into the intake of such engine or other engine.

However, this dual turning of cascade vanes 24 and 26, results in a relatively small or constricted air flow path 28 between such vanes, e.g. per FIGS. 2 and 3 hereof, which partially blocks the thrust of the reverser gases (gases 15 of FIG. 1) which requires the construction of larger assemblies of cascade vanes and impairs reverser thrust efficiency. Further, the so-reversed core gas flow, after emerging from the cascade vanes, can, in part, impinge on aft engine control surfaces, and can, in part, travel up the air frame boundary layer, over heating the engine skin, with a possibility of engine inlet re-ingestion of such gas.

U.S. Pat. No. 4,798,328 to Thayer et al (1989) and U.S. Pat. No. 4,828,173 to Guerty (1989), address the reverser problem by employing a plurality of cascade vanes, which pivot at the reverser outlet, adjacent the skin of such engine. There is no directing the reverser gas flow significantly away from the engine skin and its boundary layer, nor is there a teaching of applying lateral vectoring or splay of such reverser effluent away from aircraft control surfaces, which are important considerations in aircraft thrust reversal. That is, the above two patents disclose thrust reverser engines (with reverser cascade vanes) that have similar reverser gas boundary layer and impingement problems.

Accordingly there is a need and market to provide a thrust reverser assembly that largely overcomes the above prior art shortcomings.

There has now been discovered a thrust reverser assembly that provides an effective reverser exhaust path with sufficient pitch and splay angles and with reduced exhaust blockage in a compact package.

SUMMARY OF THE INVENTION

Broadly the present invention provides a nozzle reverser assembly for a gas turbine engine, which has reverser flaps comprising, at least one reverser opening in a side of such nozzle, a pair of fore and aft doors over said opening, having spaced-apart fore and aft transverse pivot axes, which doors pivot toward each other into closed position and which pivot away from each other into open position, in an angular upstanding reverser direction, to direct away reverser gas flow at a desired pitch angle from said engine, a swinging vane pack of spaced vanes, which pack is pivotably mounted to said engine between said doors at its forward end and near the fore door, the vane pack being mounted at its aft end, in sliding engagement with the aft door so as to be swingably mounted across the reverser exhaust opening, which vane pack has a plurality of spaced vanes which direct said reverser gas flow away from one or more aircraft components at a desired splay angle.

In a preferred embodiment said reverser door assembly is closable by a) the pivoting or swinging of the vane pack towards said engine, b) the aft door flap pivoting forwardly, to close over such vane pack and c) the fore or forward door flap (e.g. the boundary layer fence) pivoting rearwardly over the aft door, or at least over an aft door edge to present a near continuous engine skin when the reverser assembly is not in use.

In a preferred embodiment, a fail safe mechanism is provided for closing the above vane pack, aft door flap, and forward door flap in the event of hydraulic failure as more fully discussed below.

By "pitch angle" is meant an angle in the longitudinal direction of an engine or craft.

By "splay angle" is meant an angle in the transverse, lateral or cross-wise direction of an engine or craft.

BRIEF DESCRIPTION OF THE DRAWINGS

The invention will become more apparent from the following detailed specification and drawings in which.

DESCRIPTION OF PREFERRED EMBODIMENTS

Figure 5:
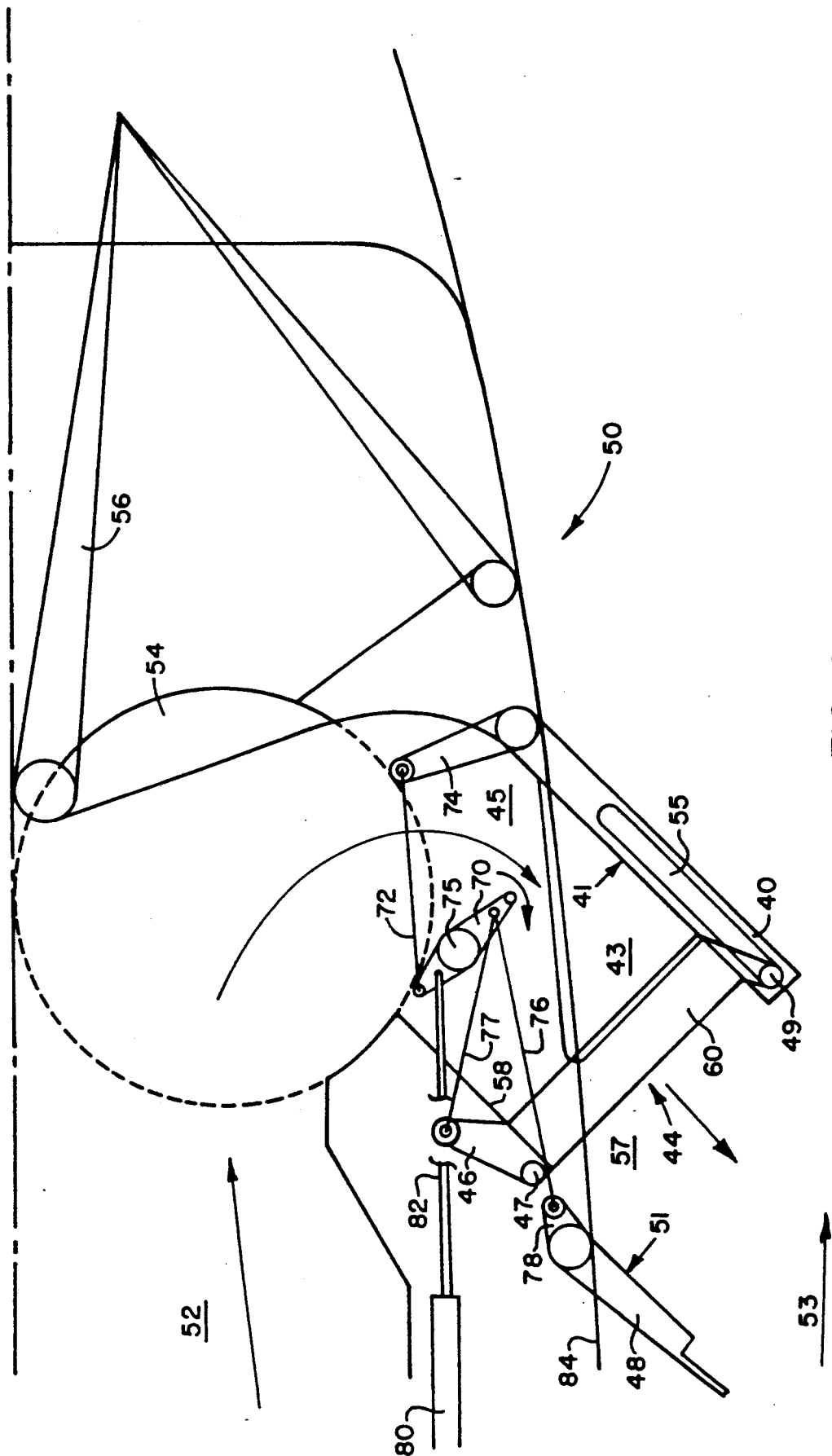
FIG. 5 is a fragmentary schematic sectional elevation view, including component linkage, of a reverser assembly embodying the present invention in an open position.
Figure 8:
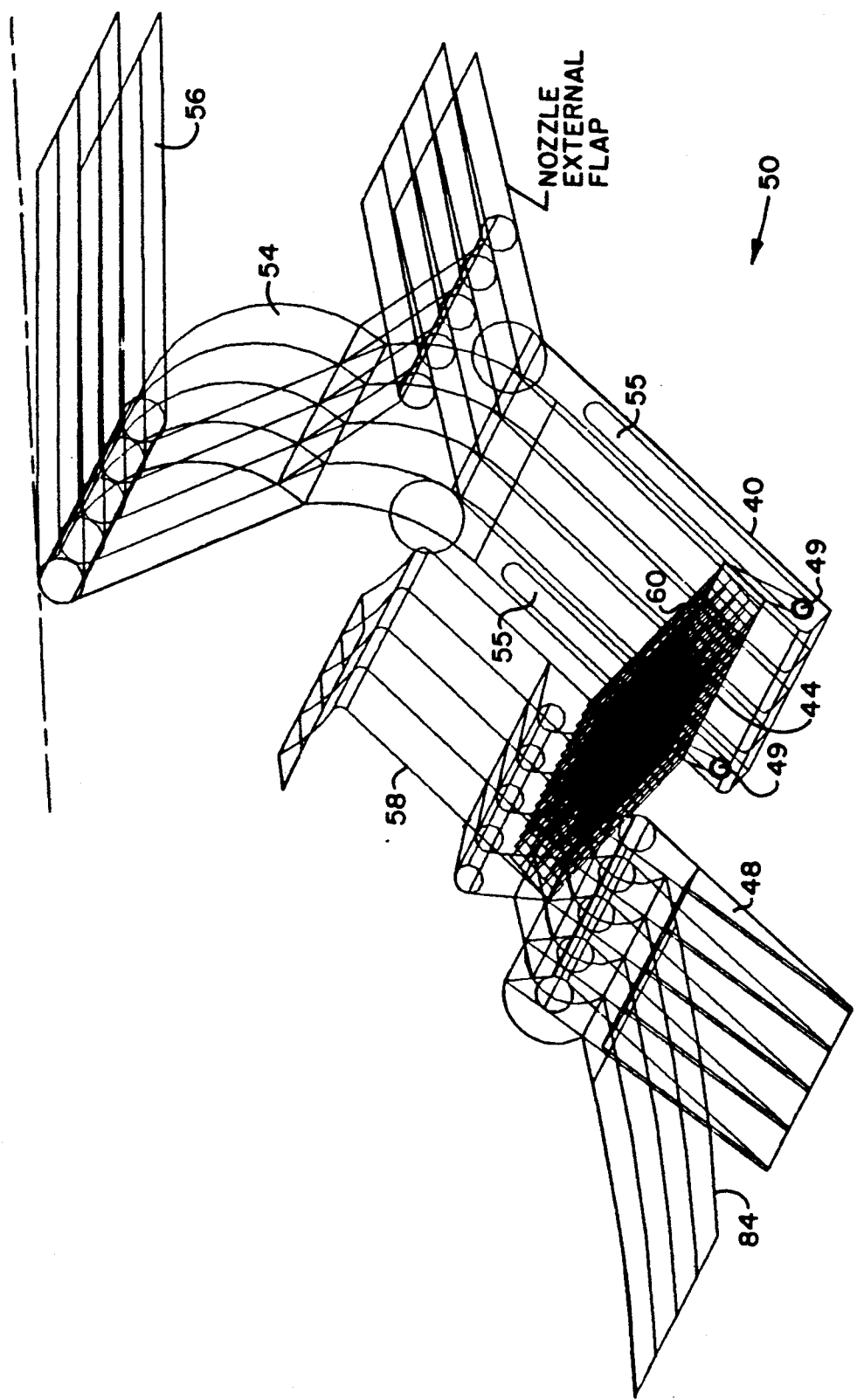
FIG. 8 is a fragmentary perspective schematic view of some of the components of the reverser assembly embodiment shown in FIG. 5
Figure 9:
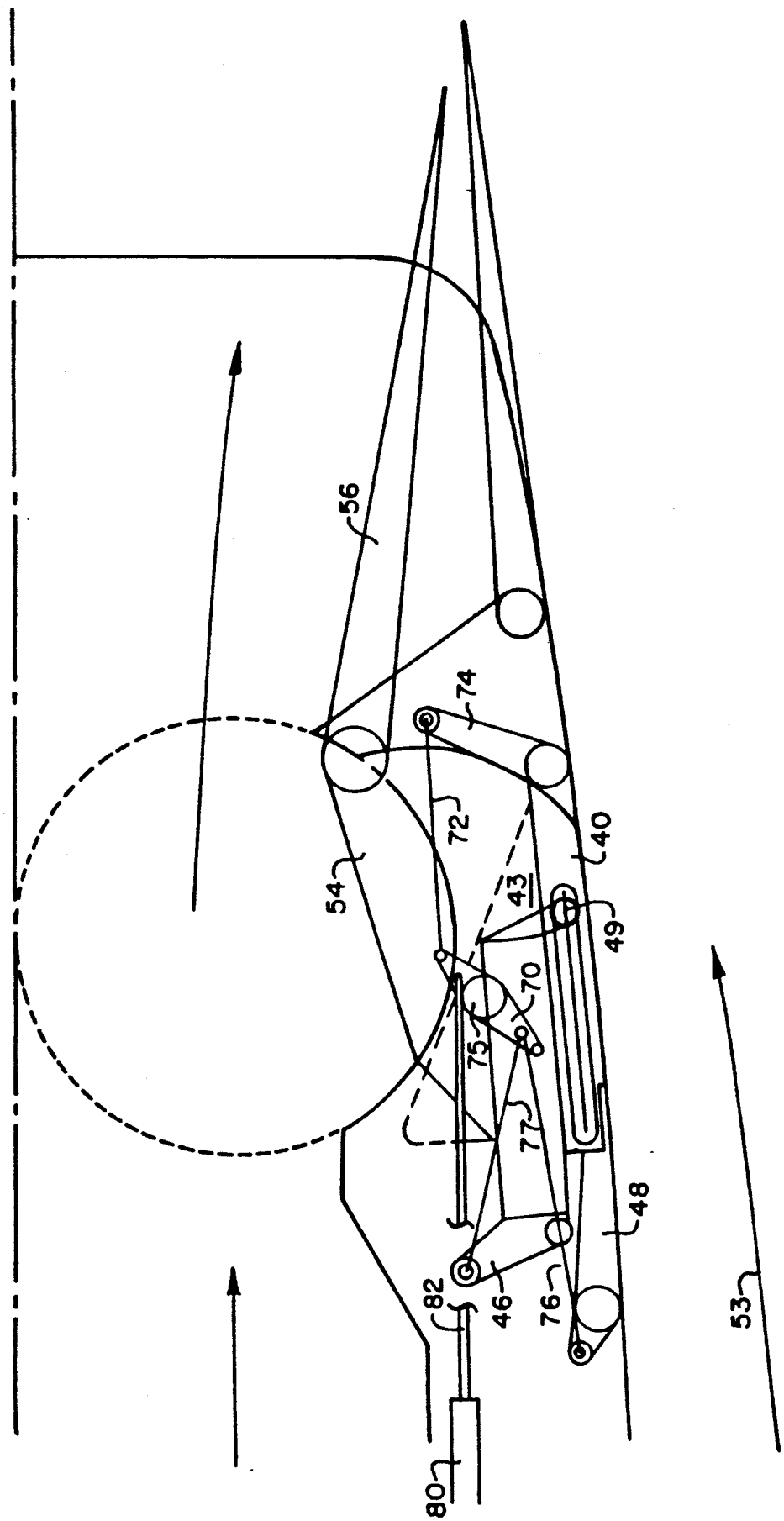
FIG. 9 is a fragmentary schematic sectional elevation view of the embodiment of FIG. 5 (with component linkage) in closed position.

Referring in more detail to the drawings, gas turbine engine 50 has core gas passage 52, convergent flap 54, divergent flap 56, reverser passage wall 58 and reverser flap door 40, having side walls 43, which door 40 when open, defines with the wall 58, a reverser passage 45, as shown in FIG. 5. A vane pack 44 is pivotably mounted on the wall 58 at the pack's forward end 47 and has rollers 49 mounted in its aft end, as shown in FIGS. 5, 8 and 9. The flap door 40 has pair of channels 55 therein to support the vane pack rollers 49 therein, as shown in FIGS. 5, 8, and 9.

Figure 6:
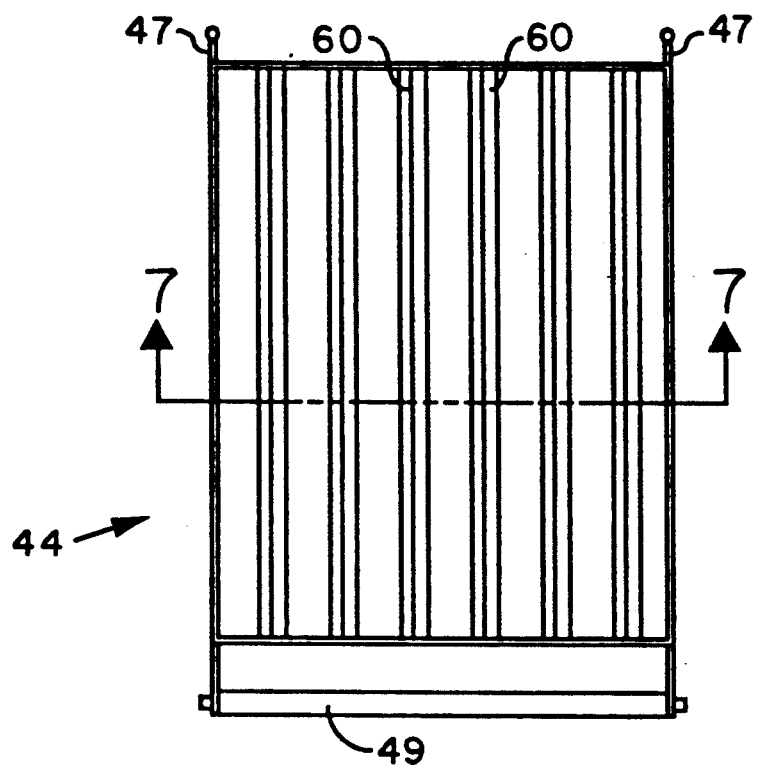
FIG. 6 is a bottom plan view of a vane pack embodying the invention, employed in the reverser assembly of FIG. 5.
Figure 7:
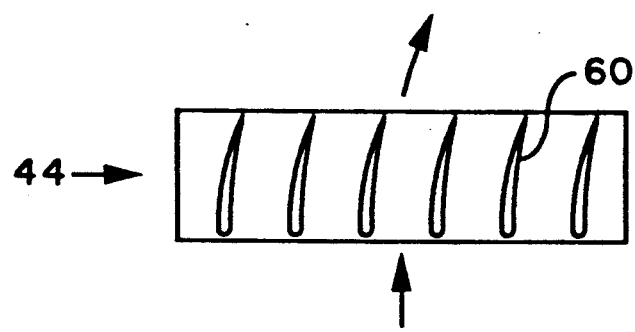
FIG. 7 is an end elevation view of the vane pack of FIG. 6, taken on line 7—7, looking in the direction of the arrows.

The vane pack 44 has a plurality of curved vanes 60 therein, per FIGS. 6, and 7, which vanes are mounted to splay the gas flow outwardly away from the aircraft skin.

A pivotable boundary layer trip fence 48 is hingeably mounted to the engine 50 per FIGS. 5, and 8. This fence 48 is linked to the flap door 40 to define therewith, a reverser outlet channel 57 per FIG. 5 and to pivot open and closed therewith, as indicated in FIGS. 5 and 9 hereof.

That is, pivot arm 70, on pivot axis 75, connects at one end by rod 72 with flap door lever 74, which connects in turn with flap door 40 per FIG. 5 hereof. The other end of pivot arm 70 connects by rod 76 with trip fence lever 78, which connects in turn with the trip fence 48 also per FIG. 5 hereof. Further, such arm (end) 70 connects by rod 77 with vane pack lever 46, which connects in turn with vane pack 40, also per FIG. 5 hereof.

An actuation cylinder 80 connects by piston rod 82 to the pivot arm 70, per FIG. 5, such that, when the piston rod 82 pushes on the arm 70, it will close the vane pack 40 up the channels 55, close the flap door 40 forward, toward the engine skin 84 and close the trip fence 48 rearwardly, so as to overlap the closed flap door 40, as indicated in FIGS. 5 and 9 hereof.

In similar fashion, when the piston rod 82 pulls on the pivot arm 70, it will cause the trip fence 48, flap door 40 and vane pack 44 to pivot in the reverse direction to the opening position shown e.g., in FIG. 5.

In operation, the gas flow turned into the reverser passage 45 by convergent flap 54, is guided further by the door flap 40 and is prevented from spilling laterally off such door by the sidewalls 43 as indicated in FIG. 5. The flow then enters the vane pack 44, with the vanes 60 oriented to direct the gas through exit channel 57 at the desired pitch and splay angles.

The boundary layer trip fence 48 prevents the hot gas, exiting the reverser at channel 57 from traveling up the air frame boundary layer so as to prevent external aircraft skin over heating as well as reducing the chance for engine inlet, re-ingestion of such gas flow.

When the reverser flow is redirected or cut-off, e.g. by opening the convergent flap 54, the swinging vane pack reverser embodying the invention is closed, as discussed above, (and shown in FIG. 9) by actuator 80, that drives the above described linkage, which is connected to the trip fence 48 and the vane pack 44. The trip fence stow rate can be adjusted, e.g. by changing the shape of the roller track 55 or the length of the pivot arm 70 as desired.

The flap/trip fence closure linkage shown in FIGS. 5 and 9 hereof, is a fail-safe closure mechanism in which air pressure on the speeding aircraft will exert a closing pressure on the trip fence 48, which in turn drives the linkage shown in FIG. 5, to close the vane pack 44 and the door flap 40, in the event of hydraulic failure of the actuator 80, as indicated in FIGS. 5 and 9 hereof.

Thus swinging vane pack reverser embodying the present invention provides improved performance over the prior art in several ways.

Figure 1:
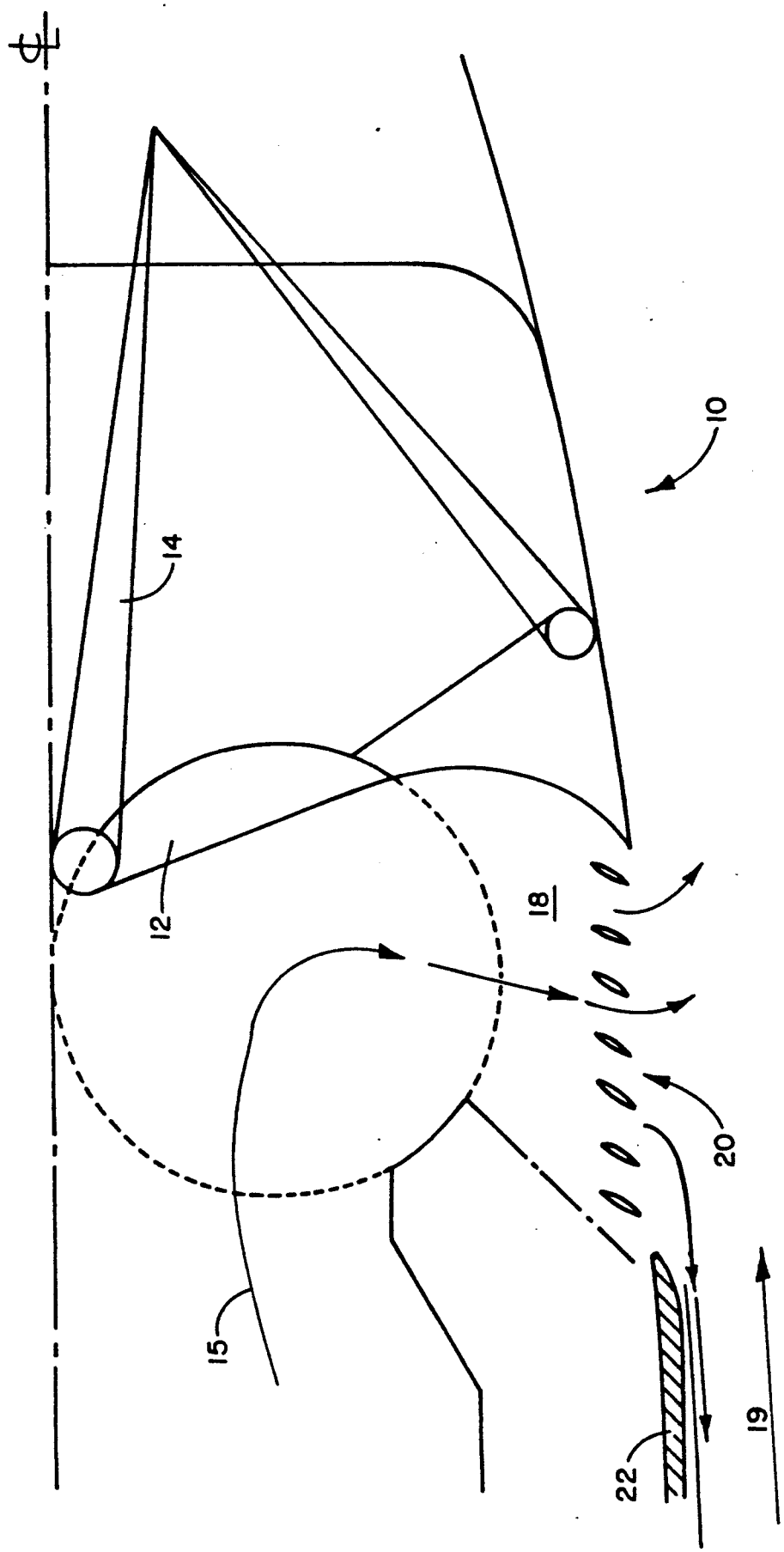
FIG. 1 is a sectional elevation schematic view of a prior art reverser assembly.
Figure 2:
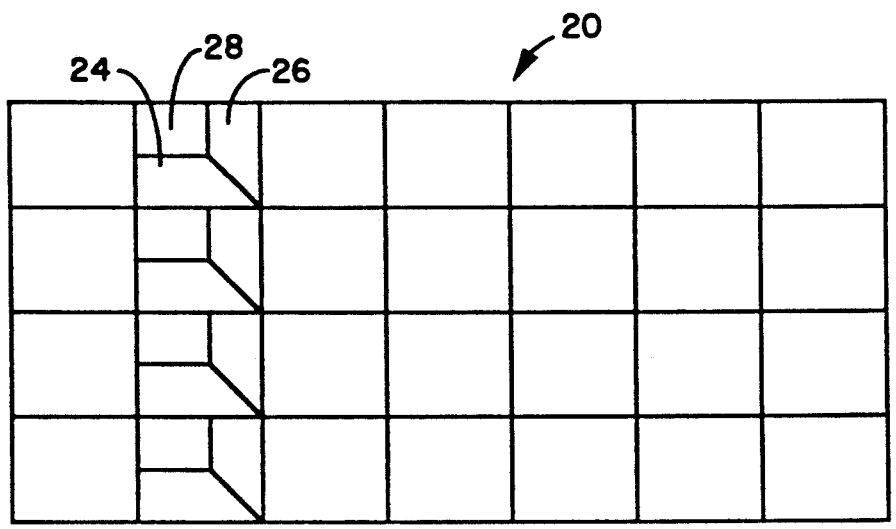
FIGS. 2, 3, and 4 are plan, end and side elevation views of the prior art cascade vane grid in the assembly of FIG. 1.
Figure 3:
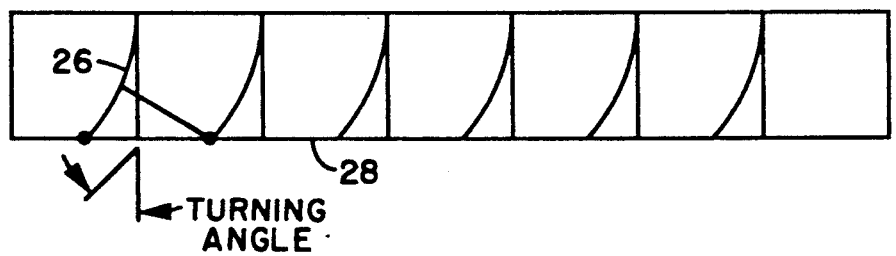
Figure 4:
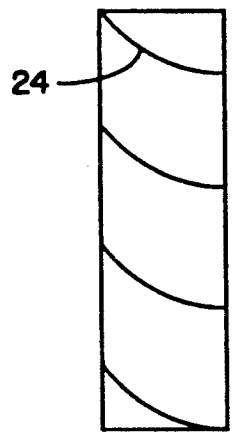

1) That is, the vanes in the vane pack of the invention are arranged louver style rather than in a grid style of the prior art, per FIGS. 2, 3, and 4, which grid style causes substantial flow blockage, due to dual gas turning, compared with the more open vane louver style of the present invention, e.g. per FIGS. 6 and 7.

Accordingly, the more open louvered vane pack design embodying applicant's invention, provides increased reverser thrust, e.g. from 5 to 10% or more.

2) The swinging vane pack 44 of the invention serves a dual purpose, a) the vanes of such pack are oriented to adjust the splay angle of the reverser gas in a desired transverse direction, away from the aircraft as noted above and b) supports the flap door 40 in the open position, e.g. per FIG. 5 hereof, against a high $\Delta P$ on the inner side thereof, indicated by arrow 41 in FIG. 5.

3) The above high $\Delta P$ of the exiting reverser gas, also aids in the keeping the trip fence 48 open, per vector arrow 51 of FIG. 5, against the onrushing air by the aircraft, per arrow 53 of FIG. 5.

Thus, the swinging vane pack reverser of the invention provides louvered vanes that permit lateral vectoring or splay of reverser gas flow, to prevent impingement of such flow on aircraft control surfaces. Meanwhile the flap door and trip fence of the invention direct the reverser gas flow forwardly but at a pitch angle, away from the aircraft skin surfaces.

In sum the flap door and trip fence provide the fore and aft or longitudinal component of reverser thrust vectoring, while the vanes in the vane pack, provide lateral vectoring of the reverser gas flow, for multi-directional reverser thrust control. That is, the concept of the swinging vane pack reverser embodying the invention, is believed a novel means for providing effective pitch and splay angles while minimizing reverser exit flow blockage.

What is claimed is:

1. A reverser assembly for a nozzle of a gas turbine engine which has internal reverser flaps comprising, a reverser opening on at least one side of the nozzle, a forward door and a rearward door mounted over said opening having spaced-apart pivot points, which doors pivot toward each other into closed position and which pivot away from each other into an open position, projecting from the side of said engine to direct reverser gas flow away from said engine at a desired pitch angle in a fore and aft direction, a swinging vane pack pivotably mounted at one end proximate said forward door, between said pivot points, to said engine, said vane pack being mounted in sliding engagement at the other end thereof with said aft door so as to be swingably mounted across the reverser exhaust opening, which vane pack has a plurality of spaced vanes which can be oriented to splay reverser gas away from aircraft components in a laterally vectoring direction relative to said engine so as to provide multi-directional reverser flow control for said engine.

2. A nozzle reverser assembly for a gas turbine engine having a housing comprising at least one reverser opening in said housing, a fore door mounted to said housing forward of said opening, an aft door mounted to said housing rearward of said opening, which doors pivot open and closed in opposite directions at spaced-apart pivot points and which when open, angle forward to upstand from said engine, a vane pack which is pivotably mounted proximate said fore door at one end of said pack and which slidably engages said aft door at the other end of said pack, so as to extend across said opening between the pivot points of said flaps, said pack having a plurality of spaced vanes therein, running substantially fore and aft relative to said engine such that the spaced flaps direct reverser gas away from said engine longitudinally at a pitch angle and said vanes are positioned to direct such reverser gas laterally of said engine at a splay angle, in multi-directional reverser flow control.

3. The nozzle reverser assembly of claim 2 wherein said aft door flap has a pair of sidewalls extending therefrom into said reverser opening, even when said aft door is in full open position.

4. The nozzle reverser assembly of claim 2 wherein said vane pack pivots toward the engine in sliding engagement with said aft door, which aft door pivots forward, toward the engine and over said vane pack and which fore door pivots rearwardly and toward the engine so as to overlap aft door, so as to present a nearly continuous engine skin when said reverser is inactive and said doors are closed.

5. The nozzle reverser assembly of claim 4 wherein said pivoting vane pack, pivoting aft door and pivoting fore door are operated by a linked mechanism.

6. The nozzle reverser assembly of claim 5 wherein said linked mechanism serves to close said doors in the order there-given, by outside air pressure on a moving aircraft against said fore door and through the linked mechanism in the event of hydraulic failure in a fail-safe arrangement.

7. A nozzle reverser assembly for a gas turbine engine comprising, at least one reverser exit port, a door flap mounted on said engine that is hinged on the aft side of such reverser port, said door flap having side walls that extend into said port, a vane pack that is hinged to said engine proximate the forward side of said reverser port at one end thereof and has a roller attached to its aft end, said door flap having a roller track therein to receive said roller such that the vane pack is in slidable engagement at its aft end with said door flap, a boundary layer trip fence pivotably mounted on said engine forward of the mounting of said vane pack, said door flap and said trip fence opening to forward upstanding angles relative to said engine skin, with said vane pack extending across the reverser port and between said door flap and said trip fence such that gas flow turned into the reverser cavity within said engine, is directed by said door flap and its side walls toward and through said vane pack so that the door flap and trip fence, channel the reverser gas at a pitch angle, away from the boundary layer of said engine, while the vanes of said vane pack being mounted substantially longitudinally relative to the axis of said engine, are pivoted or pre-pivoted to provide lateral vectoring or splay of the reverser gas flow away from aircraft control surfaces which door flap, trip fence and vane pack are thus oriented at the desired pitch and splay angles to the exterior surfaces of said engine.

* * * * *